April 15, 1941.  T. A. RIEHL  2,238,342

HEAT SEALING RUBBER HYDROCHLORIDE

Filed Aug. 16, 1938

Inventor
Theodore A. Riehl

By
Attorney

Patented Apr. 15, 1941

2,238,342

UNITED STATES PATENT OFFICE 2,238,342

HEAT SEALING RUBBER HYDROCHLORIDE

Theodore A. Riehl, Akron, Ohio, assignor to Wingfoot Corporation, Wilmington, Del., a corporation of Delaware Application August 16, 1938, Serial No. 225,201

3 Claims. (Cl. 226—56)

This invention relates to the heat-sealing of rubber hydrochloride structures.

It is known that a tight bond can be formed between two films of rubber hydrochloride or between two portions of the same film of rubber hydrochloride by pressing the films together while heating them to the temperature at which they become tacky. This method of uniting rubber hydrochloride surfaces has particular application in the packaging industry for the closing of bags and similar structures made of rubber hydrochloride film.

Although such a seal or union is formed instantaneously the rubber hydrochloride remains tacky for some little time. If one package is placed upon the fresh, hot, tacky seal of another package the packages may stick together. It is the object of this invention to overcome this difficulty.

According to the invention the seal is coated with a non-adhesive material which adheres to the seal. This prevents the freshly formed seal from adhering to another package or any other material. The coating may be applied by dusting or in any other suitable way. According to a preferred form of the invention the coating is applied to the hot plate used for sealing the rubber hydrochloride and is deposited on the rubber hydrochloride during the sealing operation.

For example, the hot plate used for sealing may be coated with a water dispersion of a soap, for example sodium oleate, stearate or palmitate, zinc stearate, etc., or with a solution of paraffin or other wax in petroleum distillate or alcohol or other solvent, preferably low boiling. This may be brushed onto the hot plate just prior to the sealing operation.

The plate should be sufficiently hot to volatilize all of the solvent leaving a deposit of the soap or wax, etc. on the hot plate. Or, if preferred, the non-adhesive may be applied dry, without solvent. When the hot plate contacts the rubber hydrochloride in the formation of the seal a deposit of the soap or wax, etc. is transferred to the rubber hydrochloride. This deposit is not tacky and does not adhere to materials with which it contacts.

Figure 1:
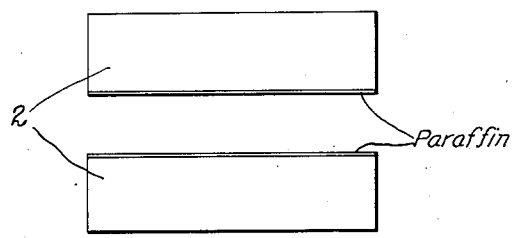
Figure 2:
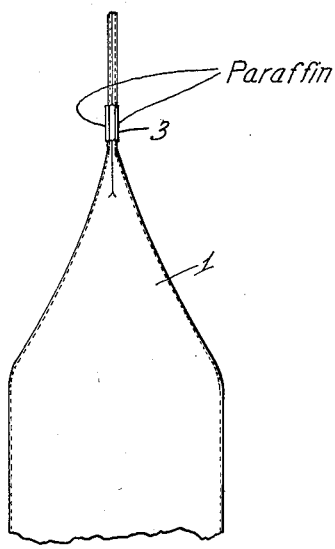

Fig. 1 shows the hot plates of a bag sealing machine or other similar device coated with paraffin or other non-adhesive. Fig. 2 shows a bag which has been heat-sealed and paraffin is deposited on the bag at the point of heat-seal.

In order to heat-seal the mouth of the bag 1, the mouth is placed between the hot plates 2 of a bag sealing machine. These plates have been coated with a thin coat of paraffin as shown in the drawing. The plates are then brought together and the temperature of the plates is sufficient to heat the rubber hydrochloride film of the bag to such a temperature that under the pressure applied the contacting surfaces of the rubber hydrochloride film coalesce. This produces a tight seal at the mouth of the bag. Paraffin is deposited on the portion of the bag with which the hot plates have been in contact. The paraffin so deposited is indicated by the numeral 3 of the drawing. On cooling, this deposit of paraffin protects the heated portion of the rubber hydrochloride and prevents it from adhering to materials with which it might otherwise be brought in contact. Although the drawing is limited specifically to the use of paraffin for coating the heated portion of the rubber hydrochloride, the invention is not limited thereto.

The application of the soap or wax or other material to the hot plate may be accomplished in a manner similar to that in which ink is applied to the type in a printing press. After each sealing operation a roller containing a solution of the soap or wax, etc. may be passed over the hot plate to leave a light deposit of the solution from which the solvent is quickly evaporated. The deposit formed in this manner does not in any way interfere with the utility of the package and if soap or wax is used no appreciable change occurs in the appearance of the package.

According to another method of carrying out the invention the package immediately after sealing is dusted with a soap such as zinc stearate, etc. This adheres to the tacky rubber hydrochloride and forms a coating which prevents the tacky rubber hydrochloride from adhering to other materials. The zinc stearate does not have any effect on the general appearance or utility of the package.

Attention is called to applicant's co-pending application, Serial No. 304,791 filed November 16, 1939, in which the product described herein is claimed.

I claim:

1. The method of uniting two rubber hydrochloride films or two portions of the same rubber hydrochloride film which comprises contacting the rubber hydrochloride at the seam with a hot plate coated with a non-adhesive and depositing the non-adhesive on the rubber hydrochloride film during the contact.

2. The method of closing a package made of rubber hydrochloride film by the application of heat and pressure to the closure thereof, which comprises bringing the rubber hydrochloride film into pressure contact with a hot plate coated with a non-adhesive in forming the closure and thereby depositing the non-adhesive on the rubber hydrochloride film during the contact.

3. The method of closing rubber hydrochloride film packages which comprises bringing a hot plate into pressure contact with successive packages to heat-seal the packages, depositing a non-adhesive on the surface of the hot plate between such successive contacts and during each contact transferring non-adhesive from the hot plate to the film.

THEODORE A. RIEHL.